April 6, 1965  K. B. KEELING, SR., ET AL  3,176,541

CONTROL KNOB WITH ADJUSTMENT MEANS

Filed March 19, 1962

INVENTORS
KERMIT B. KEELING SR.
& HOWARD B. BAUGHMAN
BY Richard L. Caslin
THEIR ATTORNEY United States Patent Office 3,176,541
Patented Apr. 6, 1965

3,176,541
CONTROL KNOB WITH ADJUSTMENT MEANS
Kermit B. Keeling, Sr., and Howard B. Baughman, Louisville, Ky., assignors to General Electric Company, a corporation of New York
Filed Mar. 19, 1962, Ser. No. 180,524
3 Claims. (Cl. 74—553)

This invention relates to control knobs usable on condition responsive devices such as thermostats for the control of temperatures in cooking ovens for ranges, and in particular to a simplified control knob and dial having means for adjusting the position of the dial relative to a calibration arm that is fastened to the knob when the thermostat is being initially calibrated, or if recalibration is required in the field to adjust the dial to actual operating conditions of the thermostat.

Specifically, the invention comprises an improvement of the design disclosed and claimed in the U.S. patent of Coultrip No. 2,179,281 which issued on November 7, 1939, and is assigned to the General Electric Company, the assignee of the present invention. In said Coultrip patent there is disclosed a hydraulic thermostatic control system that includes an adjustment knob having an integral dial where the knob is slipped onto a control shaft. This knob is operatively keyed to the operating shaft by means of a shaft-mounted offset fitting having an axially-extending lug which enters a hollow interior portion of the knob. This hollow portion is of sufficient angular extent to permit a relatively large rotational adjustment of the knob on the shaft. An adjustment plate is removably mounted within the knob and has a slot just wide enough to accommodate the passage of the lug. When it is necessary to shift the knob on the shaft into an angular position representative of the actual performance of the thermostat, the plate is unfastened and removed from the knob and repositioned on the knob according to the estimated disparity between the initial setting and the performance of the thermostat, and then returned to the knob and fastened thereto for re-examination.

This early Coultrip device has been satisfactory from the point of view of operability and reliability for many years, and has been used on hundreds of thousands of thermostats manufactured by the present assignee. The field serviceman that is called upon to make adjustments in the home for the owner of the cooking appliance has experienced that this Coultrip device has proved to be unnecessarily complex and time consuming for field calibration. Moreover, in view of the ever present burden of higher material and labor costs the design is too costly to manufacture and assemble for present economic conditions.

A principal object of the present invention is to provide a control knob with a single adjustment means that serves to secure a separate dial to the knob as well as provide means for changing the position of the dial with respect to the knob without the use of any special tools.

A further object of the present invention is to provide a control knob with an adjustment means of simple design which has a shallow front-to-back depth.

The present invention provides a control knob with a dial adjustment arrangement which is far less expensive to manufacture and apply and is much easier for appliance service men to manipulate under field service conditions than presently available calibration control knobs. In a presently preferred embodiment of this invention, the dial is a plate member that is structurally independent of the knob. This knob has a hub portion that is arranged to receive the operating shaft of the thermostat, which shaft is to be manipulated by rotation of said knob. The dial plate is rotatably mounted on said hub and means must be provided for securing both the dial to the knob as well as providing an adjustment means for varying the position of the dial on the knob when it is desired. A presently preferred embodiment of this invention provides a single combination calibration and dial securement means in the form of an annular clip fastener which is slipped over the hub and automatically locked therewith. The clip fastener is provided with an adjustable calibration arm extending radially therefrom, while the back surface of the dial is provided with a series of indexing positions for mating cooperation with the adjustable calibration arm for holding the dial from turning on the hub of the knob.

Our invention will be better understood from the following description taken in conjunction with the accompanying drawing and its scope will be pointed out in the appended claims.

Figure 1:
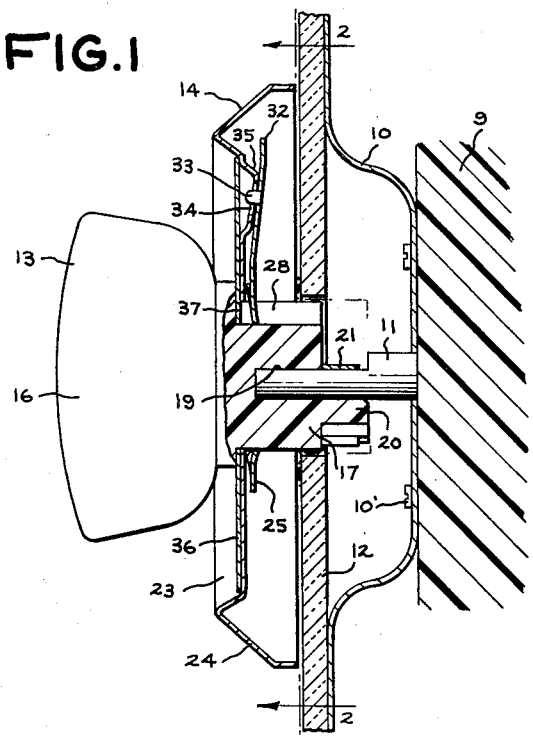
FIGURE 1 is a cross-sectional view through a control knob and its supporting thermostat where the knob has a combined fastening and adjusting means for its temperature dial according to the present invention.

Turning now to a consideration of the drawing and in particular to FIGURE 1, there is shown a temperature control device such as a thermostat 9 supported on a mounting plate 10 by fastening screws 10'. The thermostat has an operating shaft 11 that protrudes from the front portion thereof through the mounting plate and in turn through a control panel or opaque window 12 that would be formed as part of a backsplasher or other control center of a typical domestic range. This operating shaft 11 must be furnished with a control knob such as knob 13 so that the housewife will have a convenient handle for turning the thermostat shaft. This knob is also provided with a dial 14 that has a temperature scale embossed or imprinted thereon as is best seen from the back side of the dial in FIGURE 2 to permit the housewife to preselect the operating temperature of the thermostat. A fixed datum point (not shown) is marked on the glass plate 12 so that the housewife may register any desired temperature on the temperature scale with the datum point and be assured of comparable temperature control within the oven or other body whose temperature is being controlled.

Figure 2:
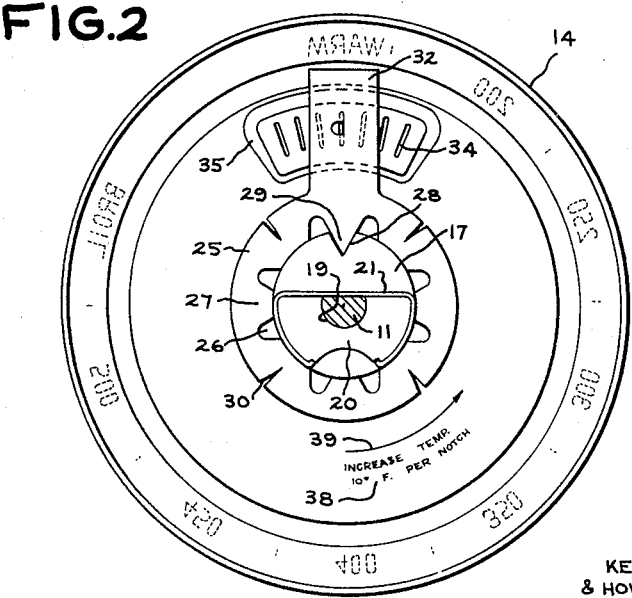
FIGURE 2 is a back view of the control knob of FIGURE 1 taken along the line 2—2 of FIGURE 1.

In FIGURE 1, the control knob 13 is of molded plastic material such as a phenolic resin or the like material, and it has a front handle portion 16 and a rearwardly extending cylindrical hub portion 17. The hub portion 17 has a central D-shaped bore 19 and a rearmost end 20 of generally C-shaped to one side of the bore as is seen in FIGURE 2 for receiving thereover a clamping spring 21. The shaft 11 of the thermostat has a mating end of semi-circular cross-section which has a force fit through the spring member 21 and into the D-shaped bore 19 of the hub portion of the knob. This connection between the hub portion 17 of the knob and the shaft 11 of the thermostat is of standard design and does not form part of the present invention.

Our invention is particularly concerned with a single adjustment means for mounting the temperature dial 14 onto the hub portion 17 of the knob for either a fixed support or an adjustable support between the two members. The central portion of the front of the dial 14 is slightly depressed as at 23, while the periphery of the dial has a backwardly beveled surface 24 on which the indicia such as the temperature scale is marked as by embossing. The central portion of the dial 14 is provided with a circular opening of approximately the same size as the cylindrical hub portion 18 of the knob for relative rotation therewith. Means must be provided for securing the dial 14 to the knob under normal use, as well as for providing an adjustment means between the angular position of the dial with respect to the knob so that the temperature scale on the dial will correspond accurately with the setting of the internal components of the thermostat.

As mentioned previously, this invention contemplates the provision of a single means for both fastening the dial to the knob as well as providing means for adjusting the angular position of the dial with respect to the knob. The dial may be fastened to the knob by means of a resilient clip fastener or lock washer 25 which is of generally annular shape for a close fitting engagement over the cylindrical hub portion 17. The inner periphery of the annular clip fastener 25 is provided with a series of notches 26 thereby forming between the notches resilient fingers or teeth 27 which are sprung back slightly as the clip is forced over the hub portion 17 due to the interference fit between the teeth and the hub. These teeth 27 tend to bite into the plastic hub and form a positive holding means which will not readily become disengaged. These teeth on the annular clip 25 prevent easy removal of the clip from the hub but they do not prevent rotary movement of the dial 14 on the hub. A sharp V-notch 28 is axially formed on the periphery of the hub 17 for receiving a light V-shaped tongue 29 of the inner periphery of the annular clip 25 for indexing the clip with respect to the hub. A further spring action can be provided for the clip 25 by slitting the outer periphery thereof as at 30 at widely spaced points such as at every 90° position and forming one side of the slit forwardly for engagement against the back side of the dial 14 as is best seen in FIGURE 1.

Next the annular clip 25 must be provided with means for engaging the dial so as to prevent relative rotation therewith and permitting a limited amount of adjustment between the dial and the clip 25 whenever the dial must be moved in order to calibrate the thermostat. The clip 25 is provided with a radially extending calibration arm 32 which has means for making engagement with the dial. In the illustrated embodiment, the arm 32 has a lanced tongue 33 as best seen in FIGURE 1 and it extends forwardly to engage within one of a series of radial slots 34 as best seen in FIGURE 2. It would not be well to have the tongue 33 visible from the front of the dial therefore the series of slots 34 are formed in a recessed pocket 35 and a decorative insert 36 is fitted into the slight depression 23 in the dial for obtaining a pleasant appearance finish for the front of the dial. This insert 36 is likewise keyed to the cylindrical hub 17 of the knob by having a V-shaped tongue 37 fitted into the notch 28 in the hub as is seen in FIGURE 1.

Suitable indicia by way of instructions are included on the back side of the dial 14 as at 38, and this indicia includes a directional arrow 39 and the information that there will be an increase in temperature of 10° F. per each change of the arm 32 in the indexing notches or slots 34 from a given position. If a decrease in temperature setting is necessary then the arm 32 is moved in a clockwise direction with respect to the dial 14. It is possible to change the position of the dial 14 with respect to the hub of the knob by slipping a finger or finger nail behind the radial arm 32 and springing the arm backward until the lanced tongue 33 is lifted from its receiving slot 34. At this point the dial is free to rotate on the hub.

Having described above our invention of a novel control knob for a temperature controlling thermostat, it will be apparent to those skilled in this art that this design is simple in construction and has the least possible number of parts, is compact in design having a shallow front-to-back dimension, and the design is easy to adjust because no special tools are necessary for assembling the knob to the shaft of the thermostat or of adjusting the temperature dial with respect to the knob. This last feature is a great importance because if the housewife learns that the oven thermostat is out of calibration, she may call the appliance service dealer and the dealer would be able to explain over the telephone how she could correct the calibration herself without paying for a service call.

Modifications of this invention will occur to those skilled in this art and it is to be understood, therefore, that this invention is not limited to the particular embodiment disclosed but that it is intended to cover all modifications which are within the true spirit and scope of the invention as claimed.

What we claim as new and desire to secure by Letters Patent of the United States is:

1. In combination,
a knob having a hub portion arranged to receive an operating shaft of an associated control device which is to be manipulated by rotation of said knob,
a dial rotatably mounted on said hub,
and combination calibration and dial securement means, said means comprising a resilient metal clip fastener of annular shape slipped over said hub and automatically locked therewith,
a flexible calibration arm extending radially from said annular member and normally biased toward the dial,
and indexing slot means on the back side of said dial for cooperation with the calibration arm for holding the dial from turning on the hub of the knob.

2. In combination,
a control knob having a hub portion on the back side thereof to receive an operating shaft of an associated control device which is to be manipulated by rotation of said knob,
a dial rotatably mounted on said hub,
and combination calibration and dial securement means, said means comprising a thin annular clip fastener slipped over said hub and automatically locked therewith,
a flexible calibration arm extending radially from said clip fastener and normally biased toward the dial,
and a series of indexing slot means on the back side of said dial for cooperation with the calibration arm for holding the dial from turning on the hub of the knob,
the dial being adjustably mounted on the hub by withdrawing the calibration arm from engagement with the indexing slot means of the dial so that the dial may be turned and the calibration arm released for cooperation with another indexing slot means of the dial.

3. A control knob having a cylindrical hub portion arranged to receive an operating shaft of an associated control device which is to be adjusted by rotation of said knob,
a temperature dial having a central opening for rotatably mounting the dial on said hub, the hub having a shoulder against which the dial is braced,
and an annular clip fastener fitted over the hub with a force fit and bearing against the dial for holding the dial,
a flexible calibration arm extending radially from said annular member and normally biased toward the dial,
and a series of indexing slots formed in the dial for cooperation with the calibration arm for holding the dial from turning on the hub of the knob,
whereby the position of the dial may be changed by withdrawing the calibration arm from engagement with its cooperating slot and turning the dial on the hub of the knob.

(References on following page)

References Cited by the Examiner

UNITED STATES PATENTS

| | | | |
|---|---|---|---|
| 232,086 | 9/80 | Stockwell | 74—553 X |
| 1,516,637 | 11/24 | Hoover | 74—544 |
| 1,571,400 | 2/26 | Erickson. | |
| 1,716,513 | 6/29 | Briggs | 338—131 X |
| 2,068,693 | 1/37 | Newell et al. | 74—553 |
| 2,179,281 | 11/39 | Coultrip | 236—99 |
| 2,541,892 | 2/51 | Schulze | 74—553 |
| 2,863,968 | 12/58 | Trautman | 74—553 X |
| 2,995,105 | 8/61 | Maltby | 116—124 |
| 3,011,039 | 11/61 | Siri | 200—139 |
| 3,086,407 | 4/63 | Reece | 74—533 |
| 3,109,411 | 11/63 | Fuhrman | 116—133 X |
| 3,109,412 | 11/63 | Fuhrman et al. | 116—133 X |

BROUGHTON G. DURHAM, *Primary Examiner.*